M. C. WALRATH.
METER BOX.
APPLICATION FILED NOV. 17, 1915.

1,206,627.

Patented Nov. 28, 1916.
3 SHEETS—SHEET 1.

Inventor
M. C. Walrath

Witnesses

By Victor J. Evans
Attorney

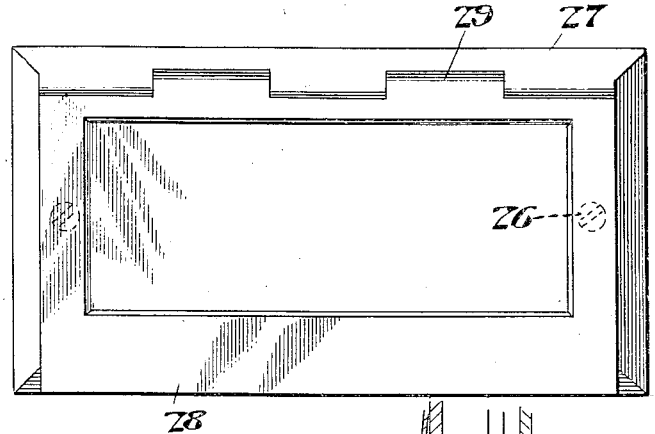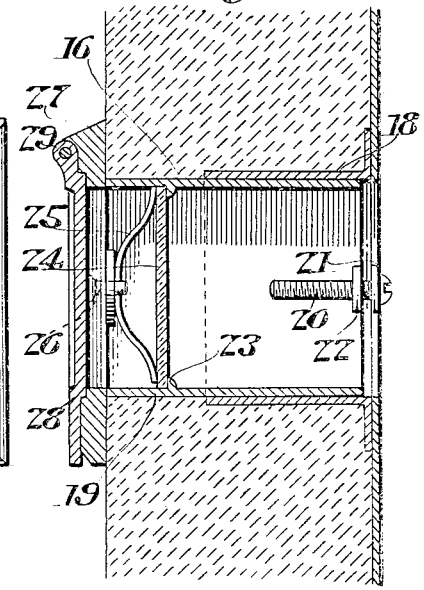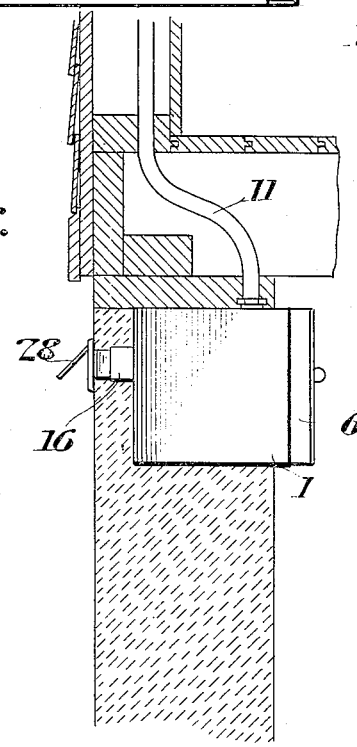

M. C. WALRATH.
METER BOX.
APPLICATION FILED NOV. 17, 1915.
1,206,627.
Patented Nov. 28, 1916.
3 SHEETS—SHEET 3.
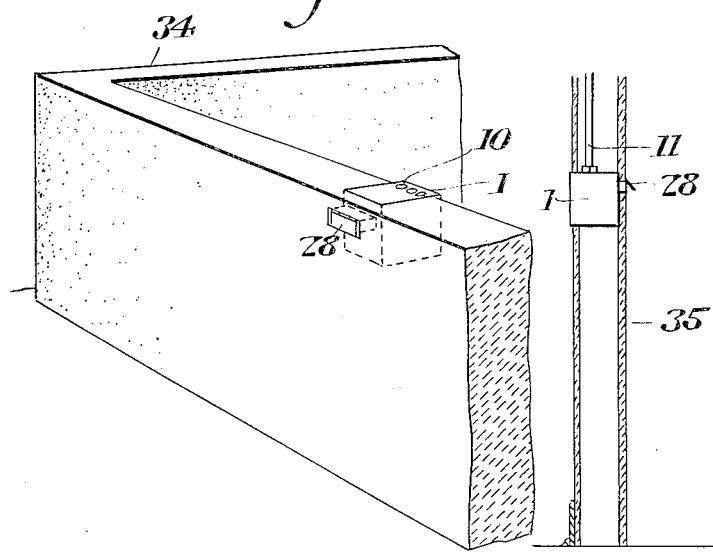
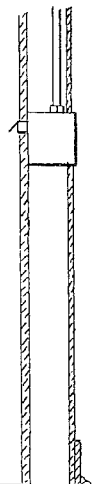
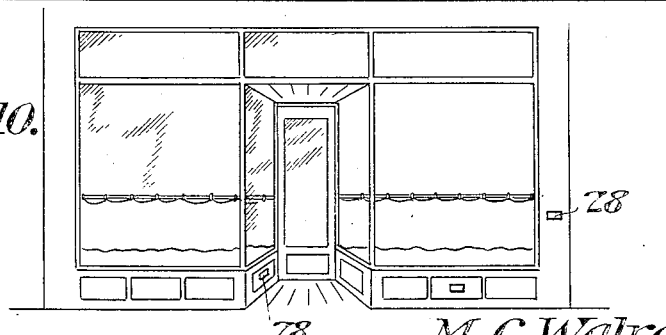
Witnesses
Inventor
M. C. Walrath
By Victor J. Evans
Attorney

UNITED STATES PATENT OFFICE.

MONT C. WALRATH, OF NORTH TONAWANDA, NEW YORK.

METER-BOX.

1,206,627.  Specification of Letters Patent.  Patented Nov. 28, 1916.

Application filed November 17, 1915. Serial No. 61,970.

*To all whom it may concern:*

Be it known that I, MONT C. WALRATH, a citizen of the United States, residing at North Tonawanda, in the county of Niagara and State of New York, have invented new and useful Improvements in Meter-Boxes, of which the following is a specification.

This invention is a direct reading meter box adapted when installed in a dwelling house, store or the like to enable an electric or gas meter therein to be read from without, without the necessity of the meter man entering the house, and when installed in an office building or apartment house to enable the meter to be read from the hall and without the necessity of the meter man entering the room or apartment of any of the tenants; the object of the invention being to provide an improved box of this character which may be installed in and adjusted to correspond with the thickness of a wall and which may be installed either while the building is being constructed or after the same has been completed and which serves to hold a meter, the fuse plugs, switches and the like, and which is also adapted for the attachment of conduit or gas pipes thereto, and which affords access to the fuse plugs and switch from within the house, room or apartment and also enables the meter to be installed in and removed from the box as desired.

The invention consists in the construction, combination and arrangement of devices hereinafter described and claimed.

Figure 1:
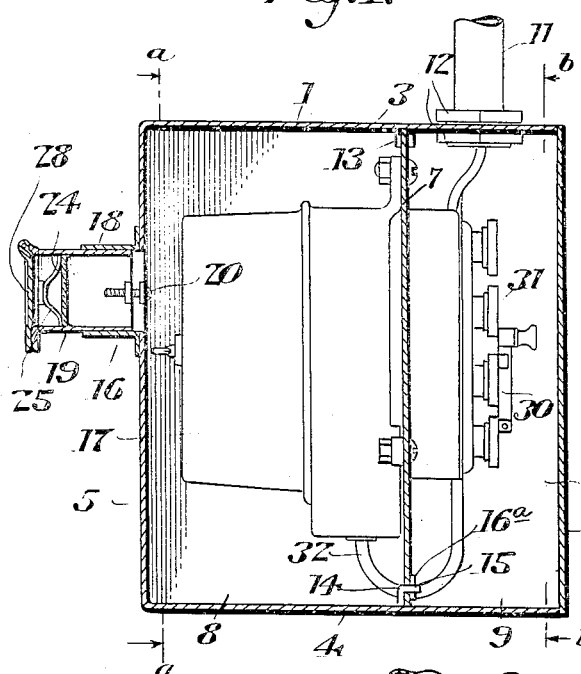
Figure 2:
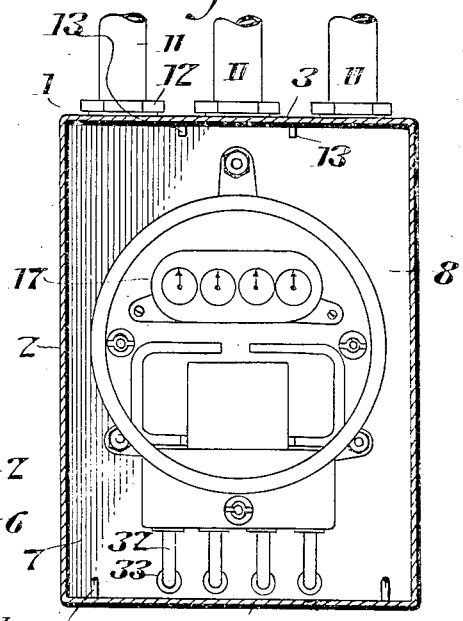
Figure 3:
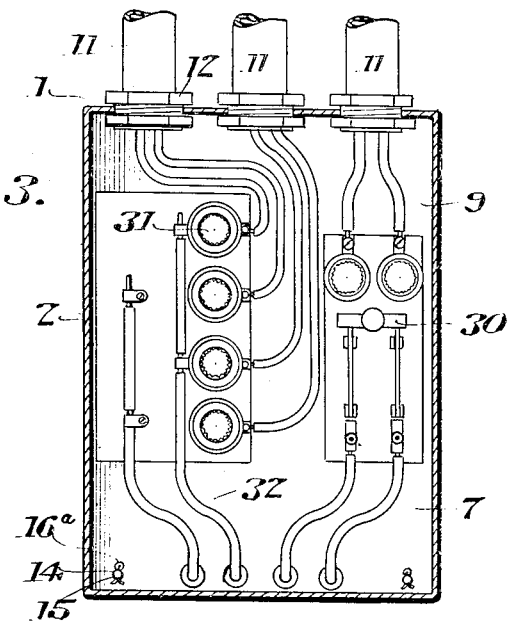

In the accompanying drawings: Figure 1 is a vertical central sectional view of a direct reading meter box constructed in accordance with my invention and showing, in elevation, an electric meter, fuses and conduit pipes arranged in and connected thereto. Fig. 2 is a transverse sectional view of the same on the plane indicated by the line *a—a* of Fig. 1. Fig. 3 is a similar view on the plane indicated by the line *b—b* of Fig. 1. Fig. 4 is a detail front elevation of the shutter or closure and the arm therefor. Fig. 5 is a detail vertical sectional view of the arm or extension of the meter box and its connections. Fig. 6 is a diagrammatic sectional view showing my direct reading meter box arranged in the wall of a dwelling for reading from without. Fig. 7 is a diagrammatic perspective view showing the arrangement of the meter box in a wall while the building is being erected. Fig. 8 is a diagrammatic sectional view of a portion of an office building and showing my direct reading meter box installed in the walls of a hall. Fig. 9 is a detail front elevation of a dwelling house provided with my improved direct reading meter box. Fig. 10 is a similar view showing a store front also equipped with my direct reading meter box.

My improved direct reading meter box 1 is constructed of suitable sheet metal and its side walls 2, top and bottom walls 3—4, and front or outer walls 5 are preferably integral as here shown. A door 6 is provided for closing the inner end of the meter box and the meter box is provided with a vertical partition wall 7 which is also preferably made of sheet metal and which when installed divides the meter box into a meter receiving chamber 8 and a chamber 9 for the reception of the fuse plugs, and switch. The top and bottom and side walls are provided at suitable points with circular indentation or weakening lines 10 adapting the material circumscribed thereby to be punched out for the formation of openings in the box and for the attachment of conduit or gas pipes 11, as the case may be, according to whether an electric or gas meter is installed in the box. The pipes are secured to the box by means of nuts 12. The meter box is preferably installed when the walls of the building are being constructed. The pipes 11 are also preferably installed at this time and the box serves to keep the pipes inside the wall. The conducting wires may be put in after the building is completed.

The upper end of the partition 7 is arranged and held between pins 13 which extend downwardly from the top of the meter box and of which any suitable number may be used. Right angled pins 14 rise from the bottom of the meter box and their horizontal arms 15 pass through openings in the partition 7, said partition having its lower end secured by cotter pins 16ª which are arranged in openings in said arms 15 of the bent pins. It will be understood that the partition may be readily placed in and may also be readily removed from the meter box.

At its front or outer end the meter box is provided with an arm or extension 16 which is opposite the face of the meter 17 so that the indicating dials and hands are readily observed from without, this arm or extension comprising an inner member 18 which is here shown as integral with the wall 5 and an adjustable member 19 the inner portion of which is telescopically arranged in the member 18. Adjusting screws 20 are provided for adjusting the member 19 according to the thickness of the wall in which the meter box is installed and so that the outer end of the member 19 will be flush with the outer side of the wall. These adjusting screws operate in openings in bars 21 at the inner end of the fixed extension or arm member 18 and engage threaded openings in corresponding bars 22 with which the adjustable member 19 is provided.

Near the outer end of the adjustable member 19, in the inner side thereof, is a stop flange 23 against which a glass pane 24 bears. Said pane is held against said flanges by spring 25. A frame 27 which is preferably a casting is secured to the member 19 by screws 26 and which is provided with a door or shutter 28, hinged at the upper side of said frame as at 29 so that the door closes downwardly and inwardly and which door or shutter when raised enables the meter to be read by looking in through the extension or arm 16, as will be understood. The switch is indicated at 30, the fuse plugs at 31 and the electric conducting wires at 32. These wires pass through openings 33 in the partition 7.

When the meter box is installed in an outer wall 34 as indicated in Figs. 6, 7, 9, and 10, the meter may be read from without the dwelling, building or store and when the meter is installed in a partition wall 35 of an office building or apartment building and between the hall and an office or apartment as indicated in Fig. 8 the meters of the various tenants may be read from the hall, and without entering the offices and disturbing the tenants.

Having thus described my invention, I claim:—

1. A meter box of the class described having spaced stops in one side and angle pins in the opposite side, a partition in the box, having one edge inserted between the spaced stops and provided near the opposite edge with openings through which the arms of the angle pins extend, and securing means on said arms detachably holding the partition in place.

2. A meter box having an extension at one side, a door in the side opposite the extension, and also having a partition dividing the box into different compartments, a meter secured on the partition and arranged in the compartment from which the extension extends, and switch plugs secured to the partition and arranged in the compartment to which the door leads.

3. A meter box having an extension at one side, a door in the side opposite the extension, and also having a partition dividing the box into different compartments, a meter secured on the partition and arranged in the compartment from which the extension extends, switch plugs secured to the partition and arranged in the compartment to which the door leads, said partition being removable from the box together with the meter, and the switch plugs attached to said partition.

4. A meter box to receive and incase a meter and having an extension at one side through which the meter may be read, a transparent pane in the extension, a frame at the outer end of the extension, a closure mounted in said frame, and holding springs attached to said frame, arranged in the extension and bearing on the outer side of the pane.

In testimony whereof I affix a signature in presence of two witnesses.

MONT C. WALRATH.

Witnesses:
 JOHN E. REINBOLT,
 GLENN WALRATH.